United States Patent
Ravikumar et al.

(10) Patent No.: US 11,047,711 B2
(45) Date of Patent: Jun. 29, 2021

(54) APPARATUSES, SYSTEMS, AND METHODS FOR IMPROVED SENSOR WIRE RETENTION

(71) Applicant: HONEYWELL INTERNATIONAL INC., Morris Plains, NJ (US)

(72) Inventors: Hemanth Hiriyur Ravikumar, Morris Plains, NJ (US); Aaron Daniels, Morris Plains, NJ (US); Murgesh R. Sajjan, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/727,998

(22) Filed: Dec. 27, 2019

(65) Prior Publication Data

US 2020/0209015 A1 Jul. 2, 2020

(30) Foreign Application Priority Data

Dec. 28, 2018 (IN) .............................. 201811049619

(51) Int. Cl.
   *G01D 5/22* (2006.01)
(52) U.S. Cl.
   CPC .................. *G01D 5/2291* (2013.01)
(58) Field of Classification Search
   CPC .... G01D 5/2291; G01D 11/24; G01D 11/245; H01R 13/5202; H01R 13/648; H01R 13/6585
   See application file for complete search history.

(56) References Cited

U.S. PATENT DOCUMENTS

| | | | |
|---|---|---|---|
| 8,604,360 B2 | 12/2013 | Knorr et al. | |
| 10,038,284 B2* | 7/2018 | Krenceski | H01R 13/6596 |
| 2016/0064132 A1* | 3/2016 | Mahajan | H01F 5/02 |
| | | | 335/255 |
| 2017/0287612 A1 | 10/2017 | Kurosu et al. | |

(Continued)

FOREIGN PATENT DOCUMENTS

JP 2008-170398 A 7/2008

OTHER PUBLICATIONS

Communication about intention to grant a European patent dated Dec 9, 2020 for EP Application No. 19219933.9, 5 pages.

(Continued)

*Primary Examiner* — Steven L Yeninas
(74) *Attorney, Agent, or Firm* — Alston & Bird LLP

(57) ABSTRACT

Apparatuses, systems, and associated methods of assembly are described that provide for improved sensor wire retention. An example sensor wire retention device includes a bobbin tube that defines a hollow interior configured to receive a probe assembly inserted therein. The device includes one or more coil elements wrapped around at least a portion of the bobbin tube. One or more washers are attached around the bobbin tube, and each of the one or more washers defines one or more wire notches. The device includes a wire harness of one or more wires, and each of the one or more wires of the wire harness are positioned within the one or more wire notches. The device further includes a return shield element disposed around the wires located within the wire notches of the one or more washers, and the return shield element compresses the one or more wires.

20 Claims, 10 Drawing Sheets

(56) References Cited

U.S. PATENT DOCUMENTS

| | | |
|---|---|---|
| 2018/0143038 A1 | 5/2018 | Daniels et al. |
| 2019/0186956 A1* | 6/2019 | Daniels ................ G01D 5/2291 |
| 2019/0267175 A1* | 8/2019 | Eldridge ................ H01F 21/04 |
| 2020/0348152 A1* | 11/2020 | Daniels .................. G01B 7/001 |
| 2021/0000466 A1* | 1/2021 | Leimbach .............. G16H 20/40 |

OTHER PUBLICATIONS

Extended European Search Report for Patent Application No. 19219933.9, dated May 25, 2020, 8 pages.

Decision to grant a European patent dated Apr 22, 2021 for EP Application No. 19219933.9, 2 pages.

* cited by examiner

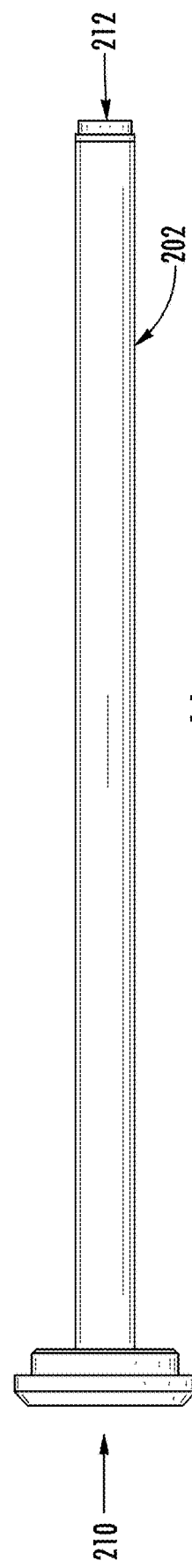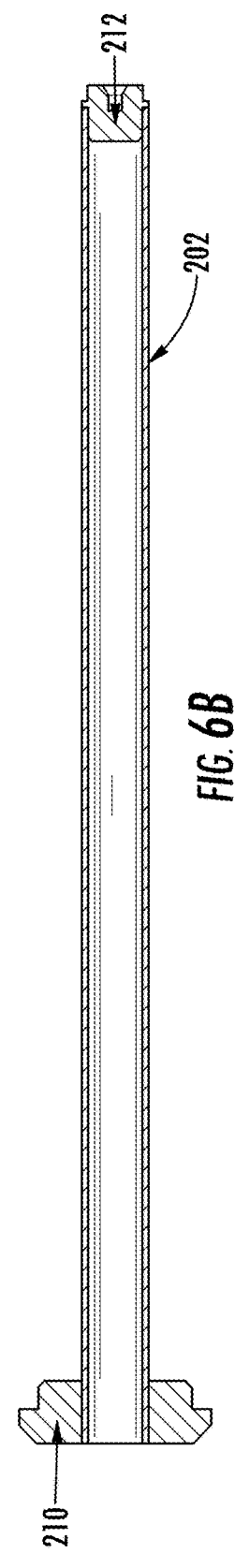

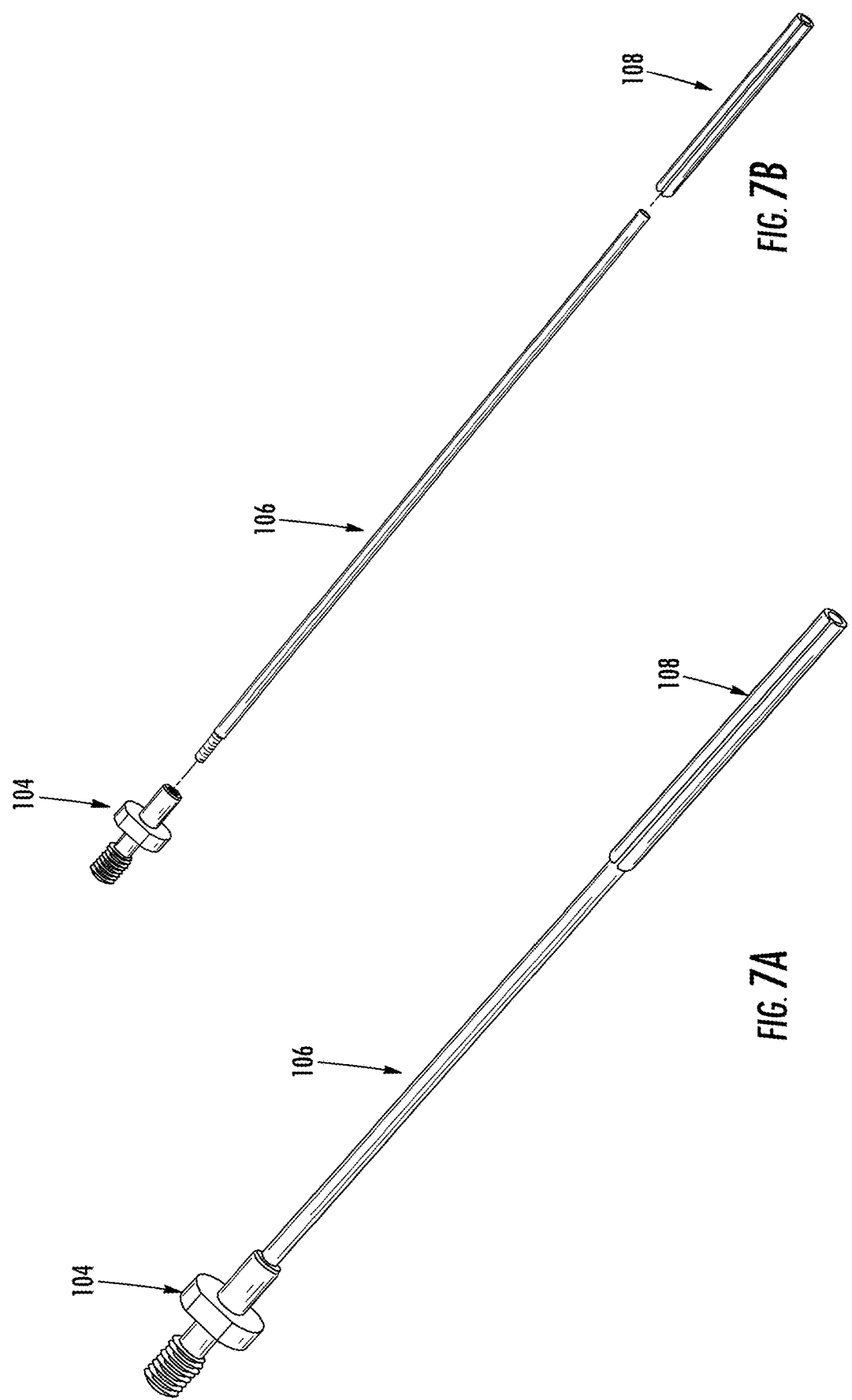

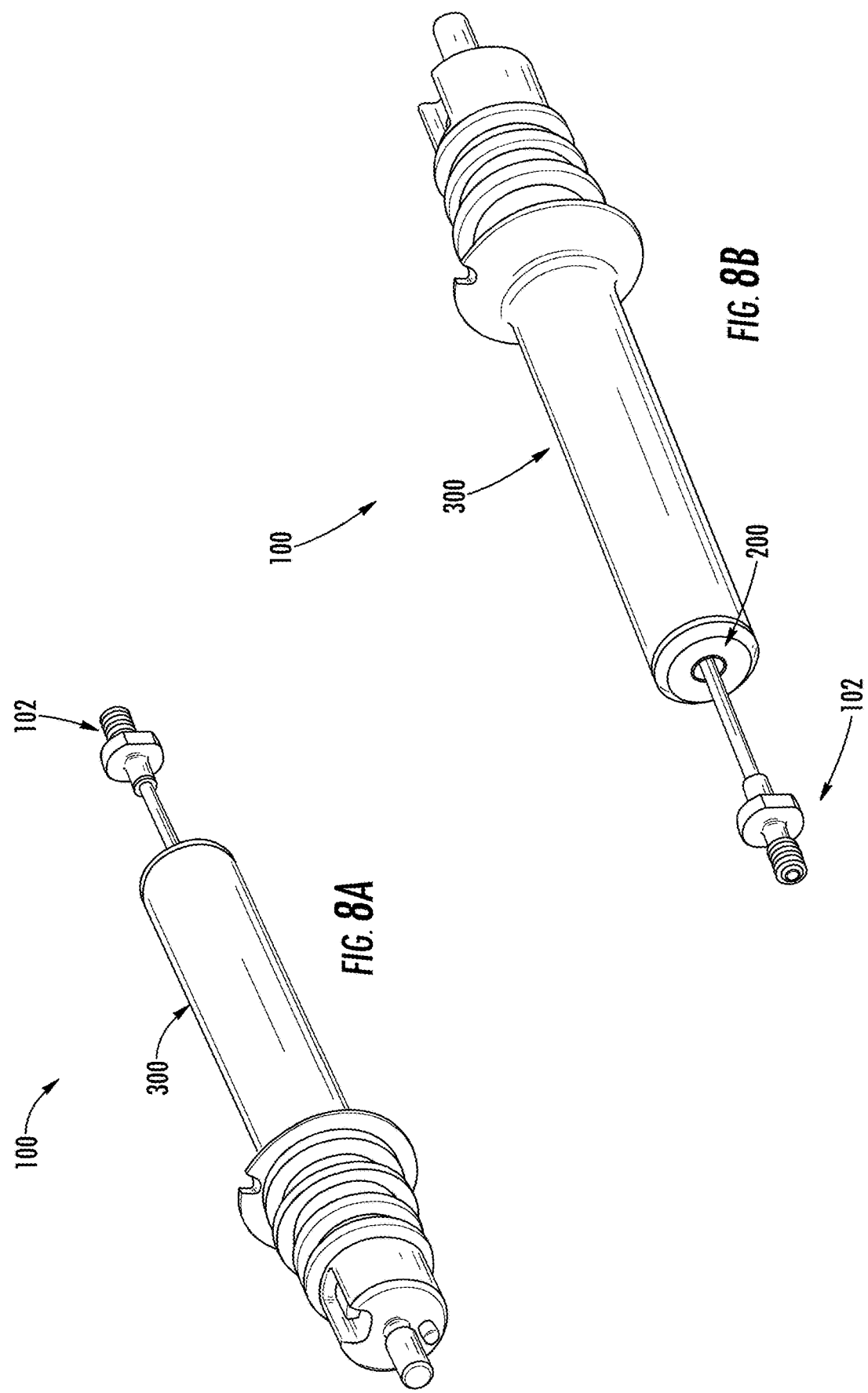

APPARATUSES, SYSTEMS, AND METHODS FOR IMPROVED SENSOR WIRE RETENTION

CROSS-REFERENCE TO RELATED APPLICATIONS

This specification is based upon and claims the benefit of priority from Indian patent application number IN 201811049619 filed on Dec. 28, 2018, the entire contents of which are incorporated herein by reference.

TECHNOLOGICAL FIELD

Example embodiments of the present invention relate generally to sensor systems and, more particularly, to improving wire retention in sensor systems.

BACKGROUND

Sensor systems, such as a Linear Variable Differential Transformer (LVDT), may be used to convert between mechanical motion (e.g., vibration, strain, force, linear motion, etc.) and electrical signals (e.g., current, voltage, etc.). These sensors may be used in hydraulic applications, engine systems, automated teller machines (ATMs), aerospace applications, and a variety of other environments in which conversion between mechanical motion and electrical signals is needed. In these applications, such as in an engine control system, the sensor system may be exposed to strain, vibrational loads, or other forces that may damage the sensor system.

BRIEF SUMMARY

Systems, apparatuses, and methods are disclosed herein for providing improved sensor wire retention. In one embodiment, with reference to the claimed device, a device for improved sensor wire retention is provided. The device may include a bobbin tube that may define a hollow interior configured to receive a probe assembly inserted therein. The device may include one or more coil elements wrapped around at least a portion of the bobbin tube and one or more washers attached around the bobbin tube. Each of the one or more washers may define one or more wire notches. The device may include a wire harness that may include one or more wires. Each of the one or more wires of the wire harness may be positioned within the one or more wire notches of the one or more washers and may be communicably coupled with the probe assembly inserted in the bobbin tube. The device may further include a return shield element disposed around the wires located within the one or more wire notches of the one or more washers. The return shield element may compress the one or more wires of the wire harness between the one or more washers and the return shield element so as to reduce strain experienced by the wires.

In some embodiments, each of the one or more washers may define two wire notches each configured to receive one or more wires of the wire harness. In such an embodiment, each of the two wire notches may be defined by opposing sides of each of the one or more washers.

In some cases, the device may also include a front fitting disposed on a first end of the bobbin tube. The front fitting may abut a portion of the probe assembly inserted within the bobbin tube. In some cases, the device may include a bobbin plug disposed on a second end of the bobbin tube opposite the first end that seals the second end of the bobbin tube.

In some embodiments, the device may include one or more insulating tape layers wrapped around the one or more coil elements. In such an embodiment, the one or more coil elements may include a primary coil and a secondary coil, and the one or more insulating tape layers may further include a first tape layer, a second taper layer, and a third taper layer. In such an embodiment, the primary coil may be wrapped around the bobbin tube, the first tape layer may be wrapped around the primary coil, and the secondary coil may be wrapped around the first tape layer. The second tape layer may also be wrapped around the secondary coil, the return shield element may be wrapped around the second tape layer, and the third tape layer may be wrapped around the return shield element.

In some cases, the return shield element may include two, semi-cylindrical halves that each extend around a portion of the bobbin tube corresponding to the one or more wire notches.

In other embodiments, the device may include a housing that receives the sensor wire retention device therein. In such an embodiment, the device may further include a potting compound disposed between the sensor wire retention device and the housing so as to reduce the relative motion between the sensor wire retention device and the housing.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIGS. 6A-6B are side views of a bobbin tube, front fitting, and bobbin plug according to an example embodiment;

FIGS. 7A-7B are perspective views of an example probe assembly according to an example embodiment;

FIGS. 8A-8B are perspective views of the assembled sensor assembly of FIG. 1 according to an example embodiment;

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The sensor assembly and sensor wire retention device described and illustrated herein may refer to a LVDT system as an example application. As would be evident to one of ordinary skill in the art in light of the present disclosure, the apparatuses, systems, and methods described herein for improved sensor wire retention may be equally applicable to sensor systems of all types, configurations, sizes, and the like. Said differently, the description herein should not be read as to only relate to LVDT applications.

Figure 1:
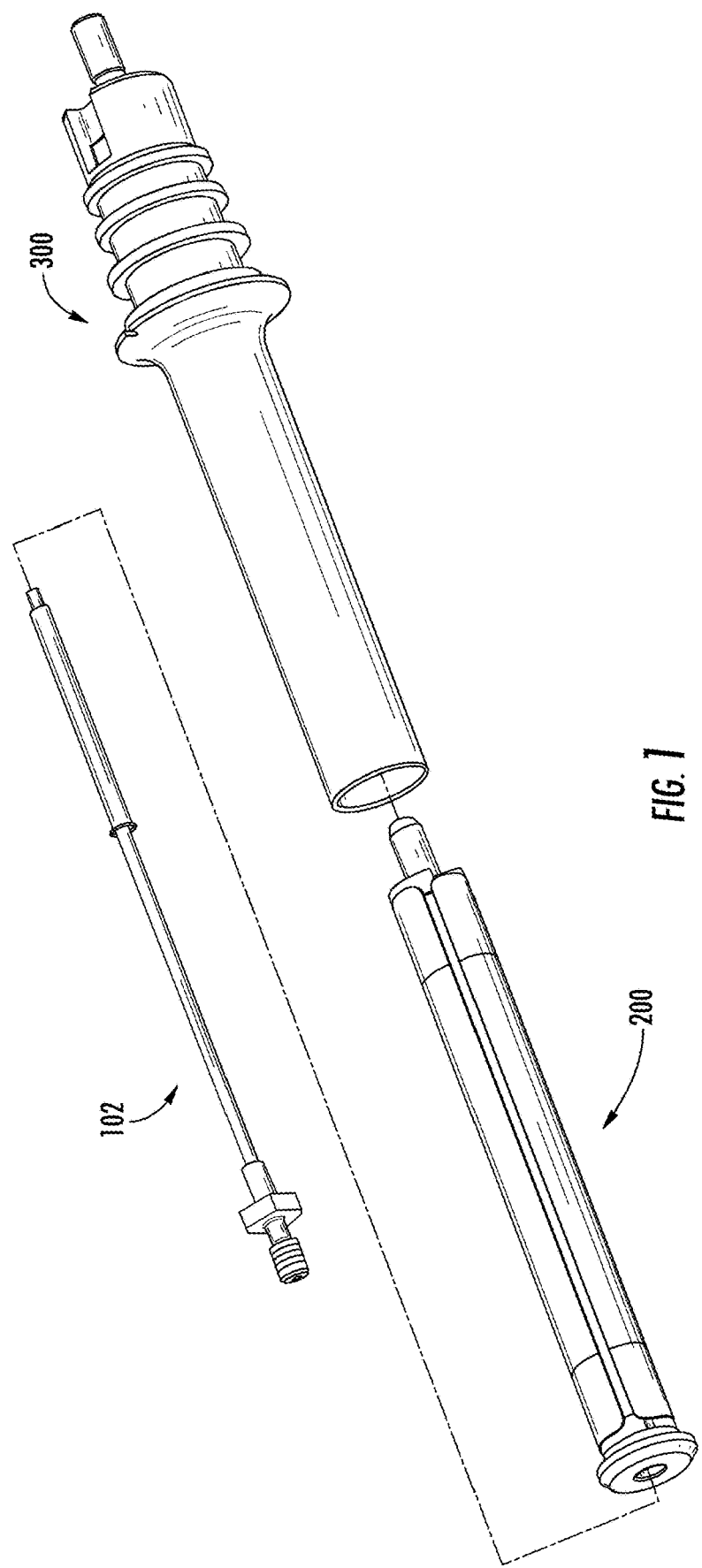
FIG. 1 is an exploded view of a sensor assembly that includes a sensor wire retention device for use with some embodiments described herein.

With reference to FIG. 1, an example sensor assembly 100 is illustrated. As shown, the sensor assembly 100 may include a probe assembly 102, a sensor wire retention device 200, and a housing 300. As illustrated and described hereafter with reference to FIGS. 8A-8B, the probe assembly 102 may be received by (inserted within) the sensor wire retention device 200 (e.g., device 200), and the combined probe assembly 102 and the device 200 may be received by the housing 300 (e.g., inserted together within the housing 300). The sensor assembly 100 may, when assembled, be installed in an engine control system or other similar application in which high vibrational loads and strain are experienced. Unlike the device 200 of the present disclosure described herein, traditional attempts at relieving this strain have required the wrapping of magnet wires over the lead wires (e.g., wire harness 206 in FIG. 2) and further wrapping tape around the wrapped magnet wires. As would be evident to one of ordinary skill in the art in light of the present disclosure, these attempts require increased assembly time and user assistance in wrapping the lead wires. Furthermore, when exposed to high vibrational loads (e.g., exceeding 200G in an engine control valve), these traditional wrapping attempts may fray or be otherwise damaged.

Figure 2:
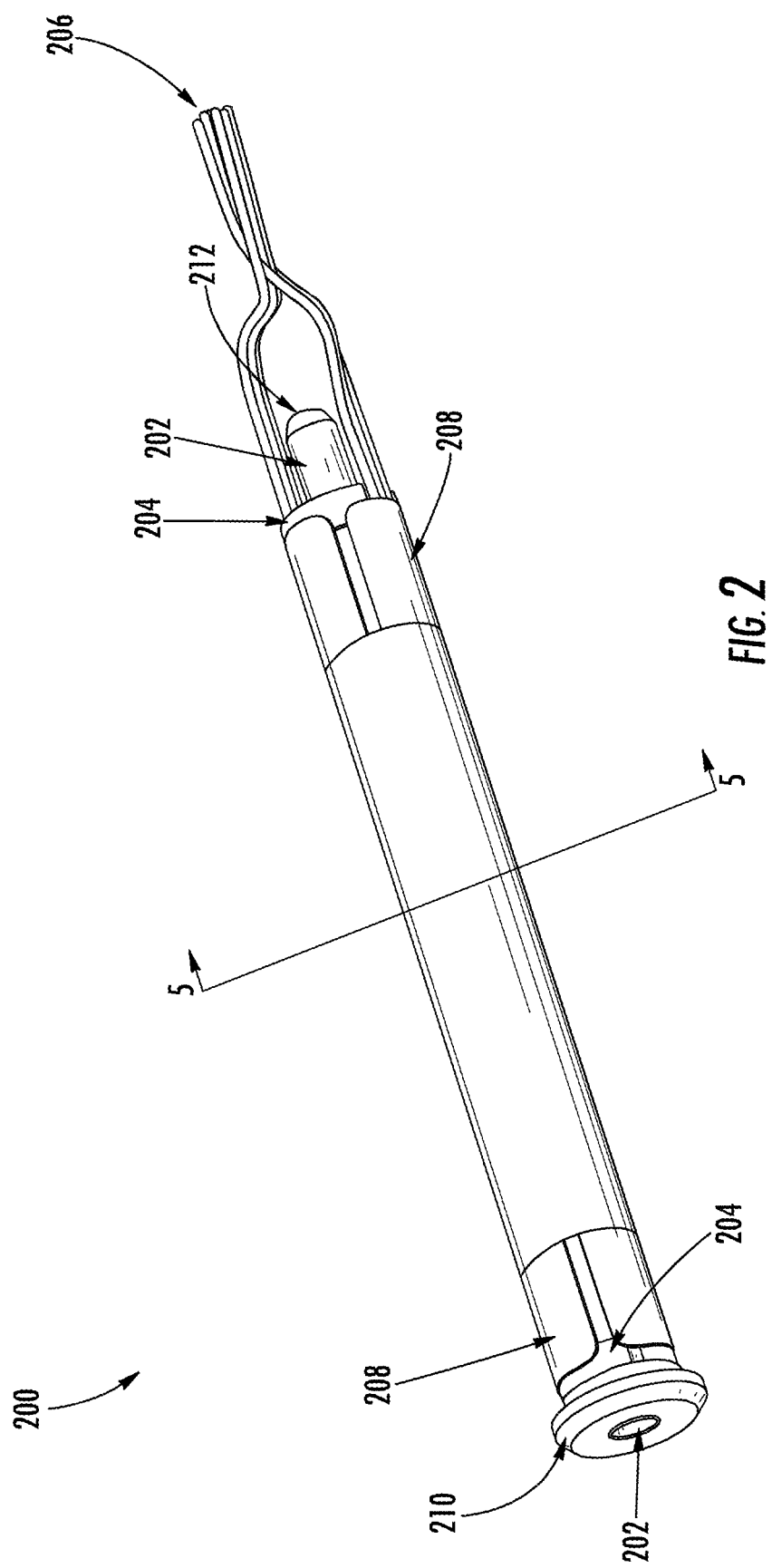
FIG. 2 is a perspective view of a sensor wire retention device of FIG. 1 according to an example embodiment.
Figure 3:
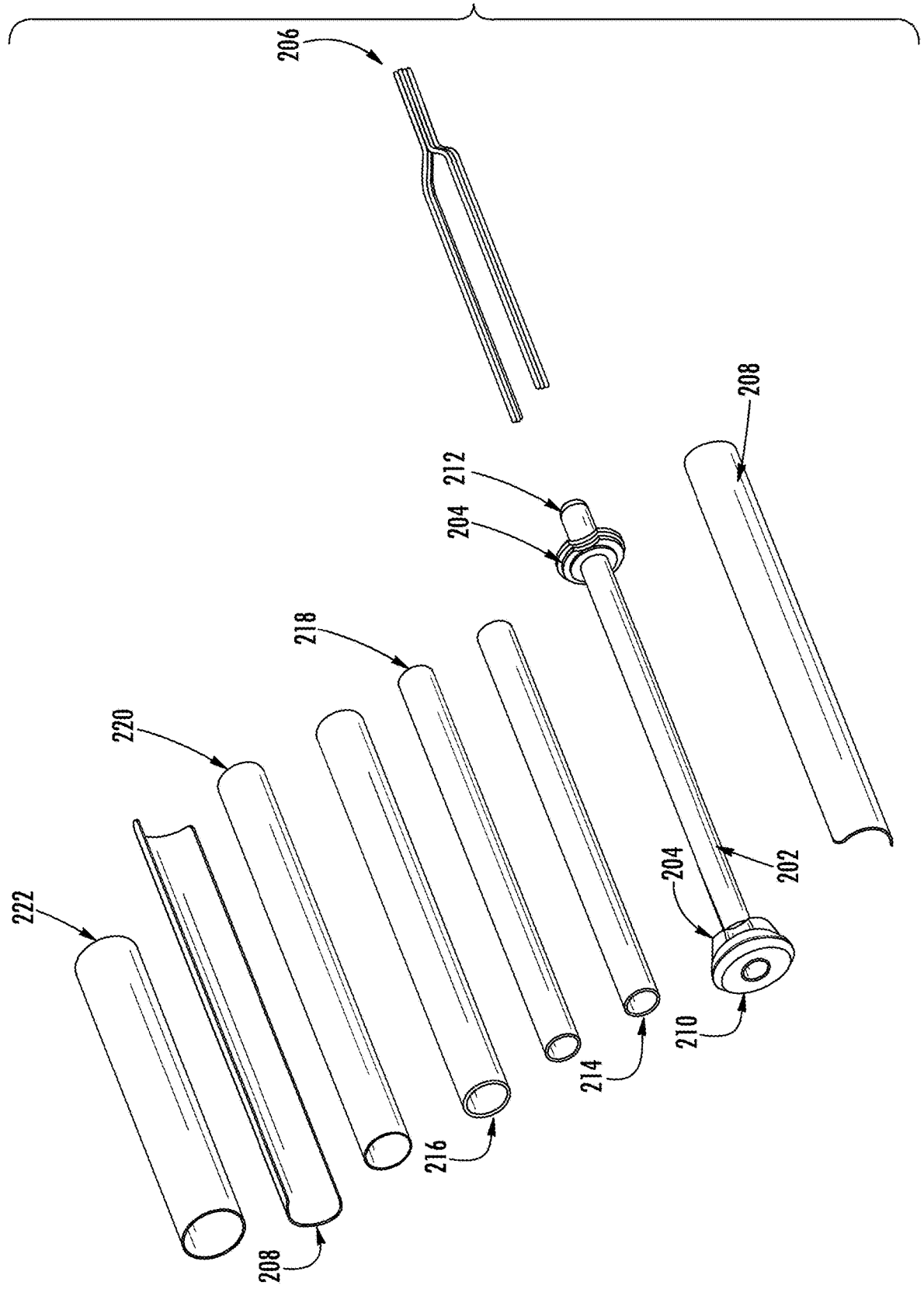
FIG. 3 is an exploded view of the sensor wire retention device of FIG. 2 according to an example embodiment.

With reference to FIGS. 2-3, an example sensor wire retention device 200 (e.g., device 200) is illustrated. The device 200 may include a bobbin tube 202, one or more washers 204, a wire harness 206, and a return shield element 208. As shown in FIG. 3, the bobbin tube 202 may be defined as a hollow cylindrical element that includes a hollow interior. As described and shown above with reference to FIG. 1, the hollow interior of the bobbin tube 202 may be configured to receive a probe assembly (e.g., probe assembly 102) inserted therein. As would be evident to one of ordinary skill in the art in light of the present disclosure, the device 200 may be configured such that when the probe assembly is inserted therein, the probe is suspended within the bobbin tube 202. Said differently, the probe assembly may be secured (e.g., at a first end described hereafter) such that the portion of the probe assembly within the bobbin tube 202 does not contact the inside of the bobbin tube 202. While illustrated and described herein with reference to a cylindrical bobbin tube 202, the present disclosure contemplates that the bobbin tube 202 may be dimensioned (e.g., sized and shaped) for use with probe assemblies of any size, shape, or configuration.

With continued reference to FIGS. 2-3, the device 200 may include one or more washers 204 (e.g., magnetic washers) that are attached around the bobbin tube 202. As described further hereafter with reference to FIGS. 4-5, in some embodiments, the device 200 may include two (2) washers 204 that are located collinearly along a length of the bobbin tube 202. As would be evident to one of ordinary skill in the art, in some instances, the washers 204 may each be formed as single members such that each washer 204 is attached at an end of the bobbin tube 202 and translated along the length of the bobbin tube 202. In other embodiments, the washers 204 may be formed as modular components such that washers 204 may be snapped or otherwise attached to the bobbin tube 202 at any location along the length of the bobbin tube 202. While illustrated and described herein with reference to two (2) washers 204 (e.g., magnetic washers), the present disclosure contemplates that any number of washers 204 may be attached to the bobbin tube 202 at any location along the length of the bobbin tube 202.

As shown in FIG. 3, the device 200 may further include one or more coil elements (e.g., a primary coil 214 and a secondary coil 216) that are wrapped around at last a portion of the bobbin tube 202. As would be evident to one of ordinary skill in the art, the one or more coil elements may be formed of a magnetic material so as to identify differential voltage readings caused by a movement of the probe assembly (e.g., probe assembly 102) within the bobbin tube 202. As shown in FIG. 3, the coil elements 214, 216 may surround at least a portion of the length the bobbin tube 202 and may, in some embodiments, span a length of the bobbin tube 202 between the washers 204 (e.g., magnetic washers). Furthermore, as shown in FIG. 3, the device 200 may include one or more insulating tape layers (e.g., a first tape layer 218, a second tape layer 220, and/or a third tape later 222) that are wrapped around one or more of the coil elements 214, 216 and the return shield element 208. As would be evident to one of ordinary skill in the art in light of the present disclosure, the insulating tape layers 218, 220, 222 may operate to shield magnetic flux (e.g., insulate) the coil elements 214, 216 as well as between other elements of the device 200.

In an example embodiment shown in the exploded view of FIG. 3, the one or more coil elements further include a primary coil 214 and a secondary coil 216, and the one or more insulating tape layers include a first tape layer 218, a second taper layer 220, and a third taper layer 222. In such an embodiment, the primary coil 214 may be wrapped around the bobbin tube 202, the first tape layer 218 may be wrapped around the primary coil 214, and the secondary coil 216 may be wrapped around the first tape layer 218. Similarly, the second tape layer 220 may be wrapped around the secondary coil 216, the return shield element 208 may be wrapped around the second tape layer 220, and the third tape layer 222 may be wrapped around the return shield element 208. In such a configuration, an insulating layer is located between magnetic elements (e.g., the coil elements and the return shield) so as to shield each of these elements from the magnetic effects of the other elements.

With continued reference to FIGS. 2-3, the device 200 may include a wire harness 206 that includes one or more wires (e.g., lead wires). The one or more wires of the wire harness 206 may be positioned via one or more wire notches (e.g., wire notches 205 in FIGS. 4-5) of the one or more washers 204 (e.g., magnetic washers). The positioning of the wires of the wire harness 206 in conjunction with the washers 204 is described hereafter with reference to FIGS. 4-5. The wires of the wire harness 206 are configured to be, when attached in the device 200, communicably coupled with the probe assembly (e.g., probe assembly 102) inserted in the bobbin tube 202. As would be evident to one of ordinary skill in the art, the wires of the wire harness 206 may be used to provide power to the probe assembly inserted in the bobbin tube 202 as well as to transmit signals (e.g., output delivery signals) generated in response to movement of the probe assembly.

The device 200 may further include a return shield element 208 that is disposed around the wires of the wire harness 206 (e.g., located within the one or more wire notches 205 of the one or more washers 204). The return shield element 208 may be configured to compress the one or more wires of the wire harness 206 between the one or more washers 204 and the return shield element 208 so as to reduce strain experienced by the wires. This compression serves as a strain relieving method that is reliable at high vibration levels by arresting the wires of the wire harness 206 (e.g., lead wires) firmly between the return shield element 208 and washer(s) 204. As described above with reference to the primary coil 214 and the secondary coil 216, the return shield element 208 may be formed of a magnetic material so as to form a magnetic shield for the device 200. In some embodiments, as shown in FIGS. 2-3, the return shield element 208 may be formed as two, semi-cylindrical halves that each extend around a portion of the bobbin tube 202 corresponding to the one or more wire notches 205. As described hereafter, the location of these semi-cylindrical halves correspond with the wire notches 205 of the washers 204 so as to ensure retention of the wire harness 206 and reduce strain experienced by the wires harness 206 (e.g., vibrational or otherwise).

Figure 4:
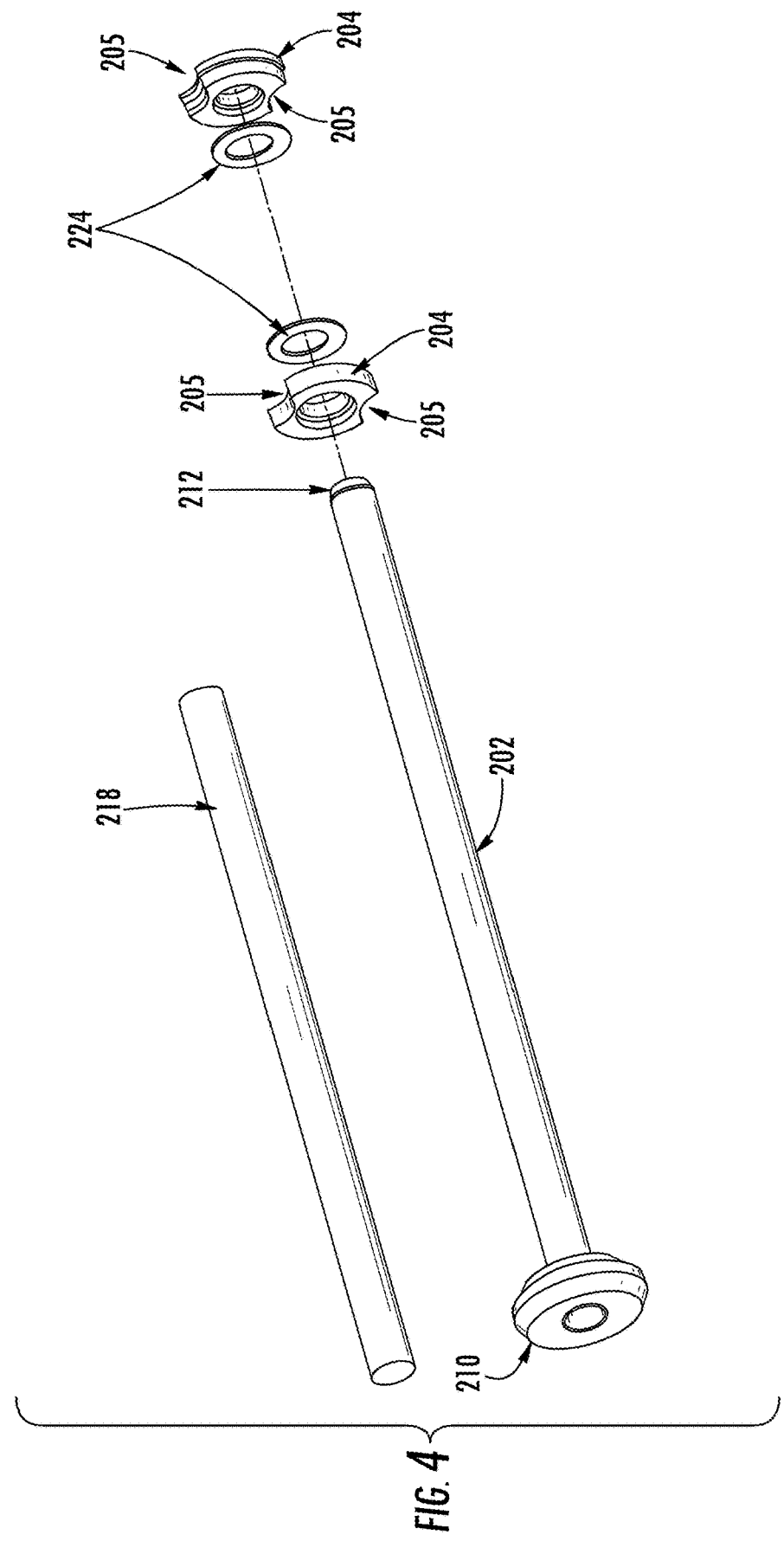
FIG. 4 is an exploded view of a portion of the sensor wire retention device according to an example embodiment.
Figure 5:
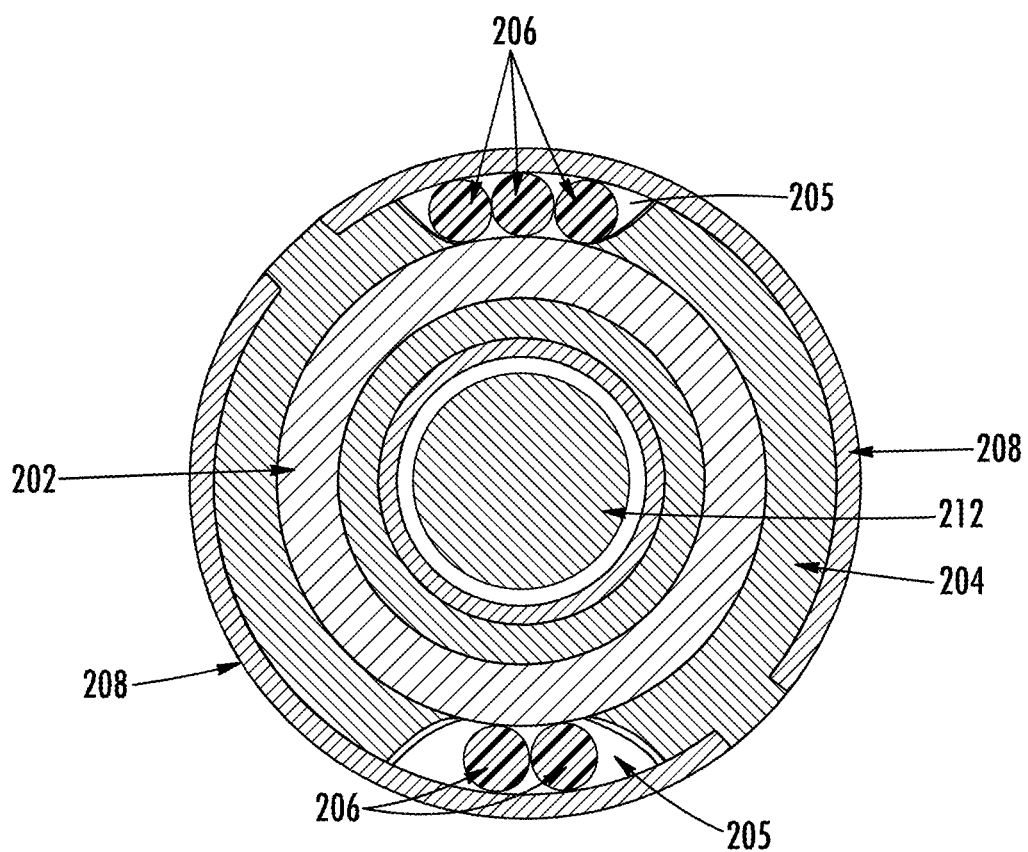
FIG. 5 is a cross-sectional view of the sensor wire retention device along the line A-A of FIG. 2 according to an example embodiment.

With reference to FIGS. 4-5, an exploded view of a portion of the device 200 and a cross-sectional view of the device 200, respectively, are illustrated. As described above, the device 200 may include one or more washers 204 (e.g., magnetic washers) attached around the bobbin tube 202, and each of the one or more washers 204 may define one or more wire notches 205. The one or more wires of the wire harness 206 may be positioned within these wire notches 205 and compressed via the return shield element(s) 208 disposed around the wires. As shown in FIGS. 4-5, in some embodiments, each of the one or more washers 204 may define two wire notches 205 each configured to receive one or more wires of the wire harness 206. In some further embodiments, each the two wire notches 205 may be defined by opposing sides of each of the one or more washers 204.

In order to ensure the appropriate compression, the dimensions (e.g. size and shape) of the wire notches 205 (e.g., the distance between the return shield element 208 and the washer 204) are optimized such that the wires (e.g., lead wires) are always in a compressed state between the return shield elements 208 and the washer 204. By arresting the lead wires firmly via this compression, the device 200 ensures that stress is not built on the connections of the wire harness 206 even under extreme vibration levels (e.g., vibrational loads exceeding 600G). The dimensioning of the wire notches 205 is critical to ensure compression while also ensuring that the wires of the wire harness 206 are not over compressed. As would be evident to one of ordinary skill in the art in light of the present disclosure, excessive compression may lead to dielectric failure of the wires. Furthermore, the geometry of the washers 204 and the return shield element 208 are controlled to eliminate sharp edges that may damage the wires of the wire harness 206. The present disclosure contemplates that the wire notches 205 may be dimensioned to accommodate any number of wires of any dimension (e.g. size and shape) received by the washers 204.

While illustrated and described with reference to two wire notches 205, the present disclosure contemplates that the washers 204 may include any number of wire notches 205 positioned at any location on the washer 204. Similarly, while illustrated with three (3) wires of the wire harness 206 in one wire notch 205 and two (2) wires in the other wire notch 205, the present disclosure contemplates that any number of wires of the wire harness 206 may be located in any wire notch 205 based upon the application of the device 200. Furthermore, the device 200 may include one or more insulating washers 224, shown in FIG. 4, that contact the washers 204 (e.g., magnetic washers). In some embodiments, the insulating washers 224 may be positioned between the washers 204 and the one or more coil elements (e.g., primary coil element 214) surrounding the bobbin tube 202.

Figure 9:
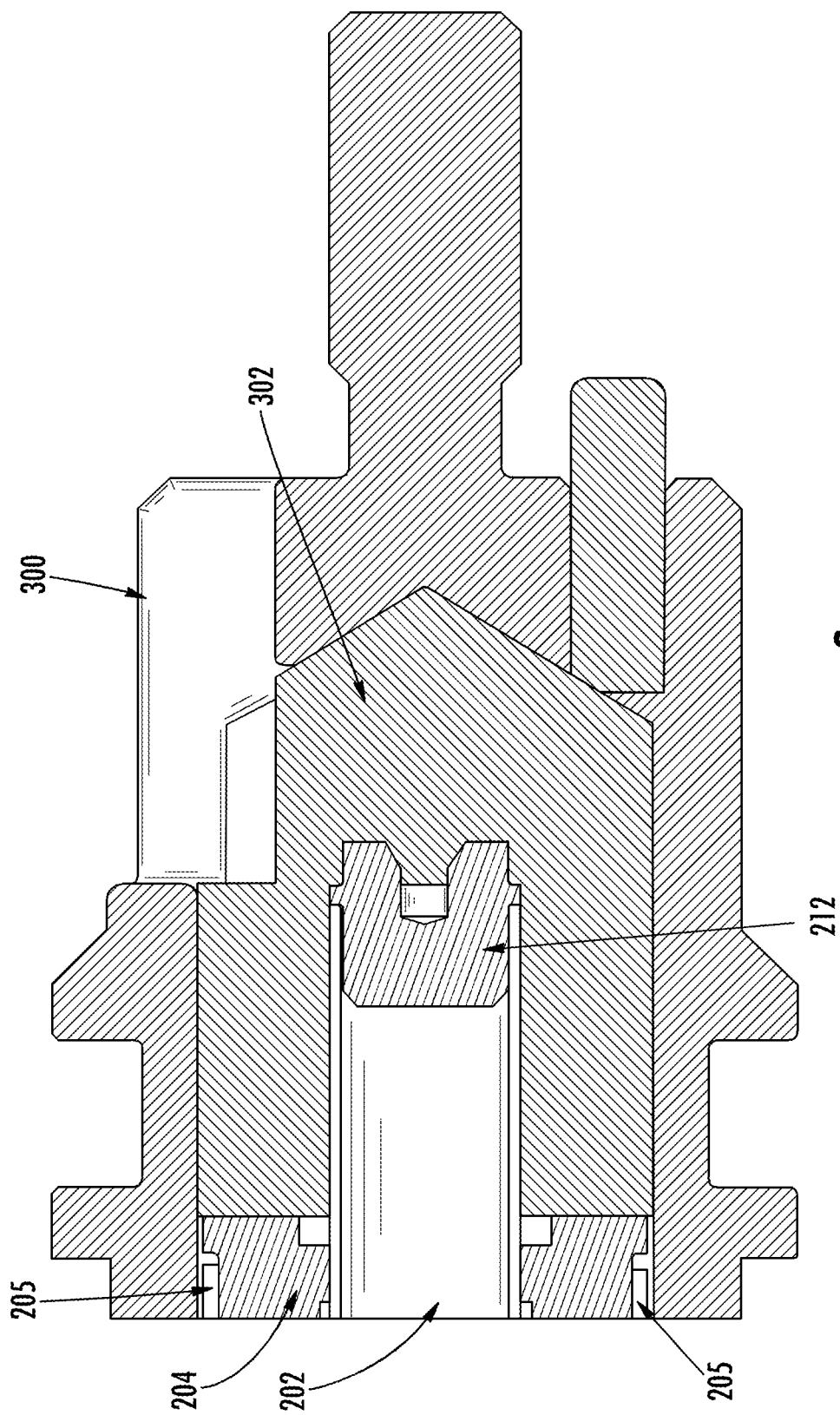
FIG. 9 is a cross-sectional view of the sensor assembly along line B-B of FIG. 8A according to an example embodiment.

With reference to FIGS. 6A-6B, side views of the bobbin tube 202 are illustrated. As shown, the device 200 may, in some embodiments, include a front fitting 210 and a bobbin plug 212. As shown, the front fitting 210 may be disposed on a first end of the bobbin tube 202 and may be configured to abut a portion of the probe assembly (e.g., probe assembly 102) inserted within the bobbin tube 202. As shown in FIGS. 7A-7B described hereafter, a fitting of the probe assembly (e.g., probe fitting 104) may abut the front fitting 210 and facilitate suspension of the probe assembly in the bobbin tube 202 as described above. The bobbin plug 212 may be disposed on a second end of the bobbin tube 202 opposite the first end, and the bobbin plug may be configured to seal the second end of the bobbin tube 202. As illustrated in FIG. 9 described hereafter, the bobbin plug 212 may prevent ingress of a potting compound into the interior of the bobbing tube 202.

With reference to FIGS. 7A-7B, perspective views of an example probe assembly 102 are illustrated. As shown, the probe assembly may include a probe fitting 104, a probe rod 106, and a magnetic slug 108. As would be evident to one of ordinary skill in the art, movement of the magnetic slug's 108 position within the bobbin tube 202 may be determined via the differential voltage readings between the one or more coil elements (e.g., primary coil 214, secondary coil 216, or the like) transmitted via the wire harness 206 communicably coupled thereto. The sensor wire retention device 200 therefore operates to reduce or otherwise prevent damage to the wire harness 206 so as to ensure consistent and accurate readings from the probe assembly 102.

With reference to FIGS. 8A-8B perspective views of the assembled sensor assembly as shown in FIG. 1 are illustrated, and, with reference to FIG. 9, a cross-sectional view of the sensor assembly along line B-B of FIG. 8A is illustrated. As shown in FIG. 9, the sensor assembly 100 (that includes the sensor wire retention device 200) may include a potting compound 302 disposed between the sensor wire retention device and the housing. As would be evident to one of ordinary skill in the art, this potting compound 302 (e.g., polyurethane, silicone, or the like) may operate to reduce the relative motion between the sensor wire retention device 200 and the housing 300.

Figure 10:
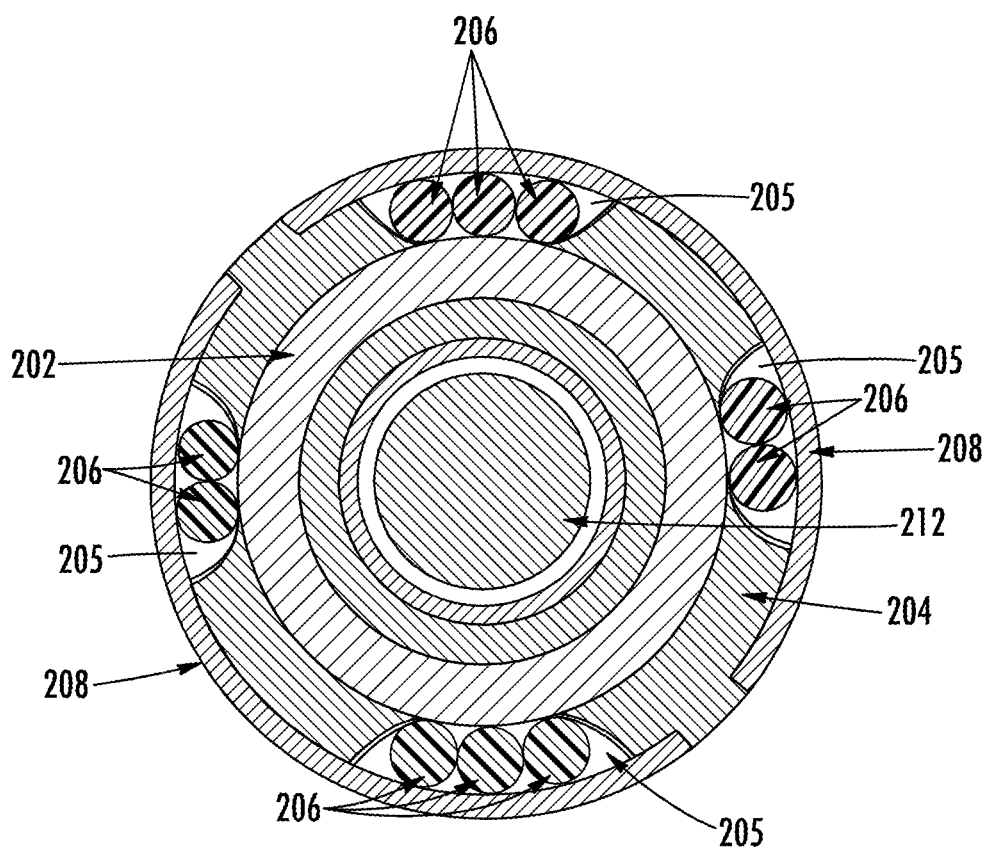
FIG. 10 is a cross-sectional view of an alternative embodiment of the sensor wire retention device.

With reference to FIG. 10, a cross-sectional view of an alternative sensor wire retention device 400 (e.g., device 400) is illustrated. As shown, in some embodiments, the device 400 may include one or more washers 204 (e.g., magnetic washers) that are attached around the bobbin tube 202, where each washer 205 defines four (4) wire notches 205. Similar to the embodiments described above with reference to FIGS. 2-5, the one or more (e.g., four (4)) wire notches 205 may be configured to receive one or more wires of the wire harness 206 (or multiple wire harnesses 206) positioned within these wire notches 205. As above, the return shield element(s) 208 disposed around the wires may be configured to compress the wires. In order to ensure the appropriate compression, the dimensions (e.g. size and shape) of the wire notches 205 (e.g., the distance between the return shield element 208 and the washer 204) are optimized such that the wires (e.g., lead wires) are always in a compressed state between the return shield elements 208 and the washer 204. While described and illustrated herein with reference to embodiments defining two (2) wire notches and four (4) wire notches, the present disclosure contemplates that the washers 204 may define any number of wire notches 205 at any location based upon the desired application.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sensor wire retention device comprising:
   a bobbin tube, wherein the bobbin tube defines a hollow interior configured to receive a probe assembly inserted therein;
   one or more coil elements wrapped around at least a portion of the bobbin tube;
   one or more washers attached around the bobbin tube, wherein each of the one or more washers defines one or more wire notches;
   a wire harness comprising one or more wires, wherein each of the one or more wires of the wire harness are positioned within the one or more wire notches of the one or more washers and configured to be communicably coupled with the probe assembly inserted in the bobbin tube; and
   a return shield element disposed around the one or more wires located within the one or more wire notches of the one or more washers, wherein the return shield element is configured to compress the one or more wires of the wire harness between the one or more washers and the return shield element so as to reduce strain experienced by the wires.

2. The sensor wire retention device according to claim 1, wherein each of the one or more washers define two wire notches each configured to receive one or more wires of the wire harness.

3. The sensor wire retention device according to claim 2, wherein each of the two wire notches are defined by opposing sides of each of the one or more washers.

4. The sensor wire retention device according to claim 1, further comprising a front fitting disposed on a first end of the bobbin tube, wherein the front fitting is configured to abut a portion of the probe assembly inserted within the bobbin tube.

5. The sensor wire retention device according to claim 4, further comprising a bobbin plug disposed on a second end of the bobbin tube opposite the first end, wherein the bobbin plug is configured to seal the second end of the bobbin tube.

6. The sensor wire retention device according to claim 1, further comprising one or more insulating tape layers wrapped around the one or more coil elements.

7. The sensor wire retention device according to claim 6, wherein the one or more coil elements further comprise a primary coil and a secondary coil, and the one or more insulating tape layers further comprise a first tape layer, a second taper layer, and a third taper layer, and, wherein:
   the primary coil is wrapped around the bobbin tube;
   the first tape layer is wrapped around the primary coil;
   the secondary coil is wrapped around the first tape layer;
   the second tape layer is wrapped around the secondary coil;
   the return shield element is wrapped around the second tape layer; and
   the third tape layer is wrapped around the return shield element.

8. The sensor wire retention device according to claim 2, wherein the return shield element further comprises two, semi-cylindrical halves that each extend around a portion of the bobbin tube corresponding to the two wire notches.

9. The sensor wire retention device according to claim 1, further comprising a housing configured to receive the sensor wire retention device therein.

10. The sensor wire retention device according to claim 9, further comprising a potting compound disposed between the sensor wire retention device and the housing so as to reduce the relative motion between the sensor wire retention device and the housing.

11. A method of assembling a sensor wire retention device, the method comprising:
   providing a bobbin tube, wherein the bobbin tube defines a hollow interior configured to receive a probe assembly inserted therein;
   wrapping one or more coil elements around at least a portion of the bobbin tube;
   attaching one or more washers around the bobbin tube, wherein each of the one or more washers defines one or more wire notches;
   positioning one or more wires of a wire harness within the one or more wire notches of the one or more washers, wherein the one or more wires are configured to be communicably coupled with the probe assembly inserted in the bobbin tube; and
   providing a return shield element around the one or more wires located within the one or more wire notches of the one or more washers, wherein the return shield element is configured to compress the one or more wires of the wire harness between the one or more washers and the return shield element so as to reduce strain experienced by the wires.

12. The method according to claim 11, wherein each of the one or more washers define two wire notches each configured to receive one or more wires of the wire harness.

13. The method according to claim 12, wherein each the two wire notches are defined by opposing sides of each of the one or more washers.

14. The method according to claim 11, further comprising providing a front fitting on a first end of the bobbin tube, wherein the front fitting is configured to abut a portion of the probe assembly inserted within the bobbin tube.

15. The method according to claim 14, further comprising providing a bobbin plug on a second end of the bobbin tube opposite the first end, wherein the bobbin plug is configured to seal the second end of the bobbin tube.

16. The method according to claim 11, further comprising wrapping one or more insulating tape layers around the one or more coil elements.

17. The method according to claim 16, wherein the one or more coil elements further comprise a primary coil and a secondary coil, and the one or more insulating tape layers further comprise a first tape layer, a second taper layer, and a third taper layer, the method further comprising:
   wrapping the primary coil is around the bobbin tube;
   wrapping the first tape layer is around the primary coil;
   wrapping the secondary coil is around the first tape layer;
   wrapping the second tape layer is around the secondary coil;
   wrapping the return shield element is around the second tape layer; and
   wrapping the third tape layer is around the return shield element.

18. The method according to claim 11, further comprising providing a housing configured to receive the sensor wire retention device therein.

19. The method according to claim 18, further comprising disposing a potting compound between the sensor wire retention device and the housing so as to reduce the relative motion between the sensor wire retention device and the housing.

20. A sensor assembly comprising:
   a sensor wire retention device comprising:
      a bobbin tube, wherein the bobbin tube defines a hollow interior;
      one or more coil elements wrapped around at least a portion of the bobbin tube;
      one or more washers attached around the bobbin tube, wherein each of the one or more washers defines one or more wire notches;
      a wire harness comprising one or more wires, wherein each of the one or more wires of the wire harness are positioned within the one or more wire notches of the one or more washers;
      a return shield element disposed around the one or more wires located within the one or more wire notches of the one or more washers, wherein the return shield element is configured to compress the one or more wires of the wire harness between the one or more washers and the return shield element so as to reduce strain experienced by the wires;
   a probe assembly, wherein the probe assembly is inserted within the hollow interior of the bobbin tube and communicably coupled with the one or more wires of the wire harness; and
   a housing disposed around the sensor wire retention device and probe assembly inserted therein.

* * * * *